Patented Mar. 1, 1949

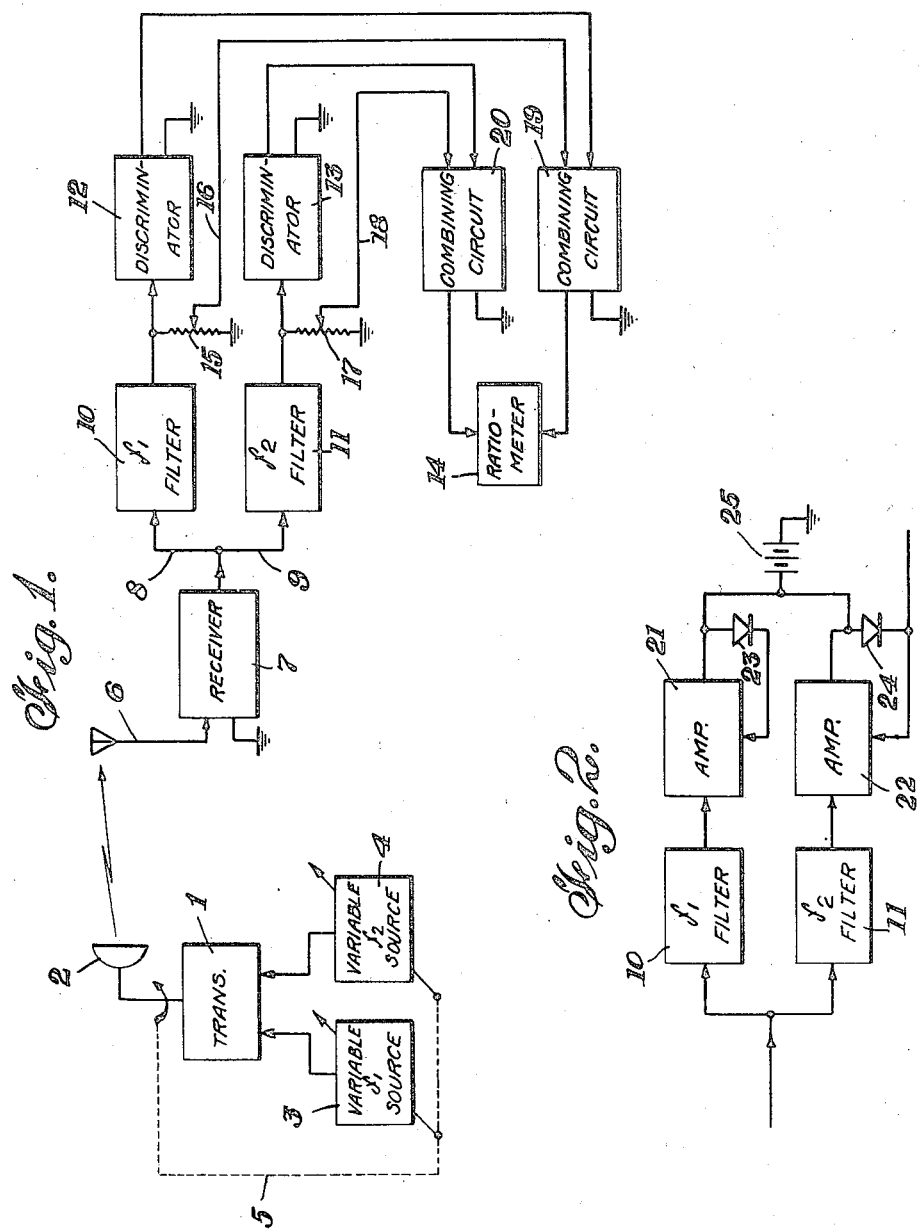

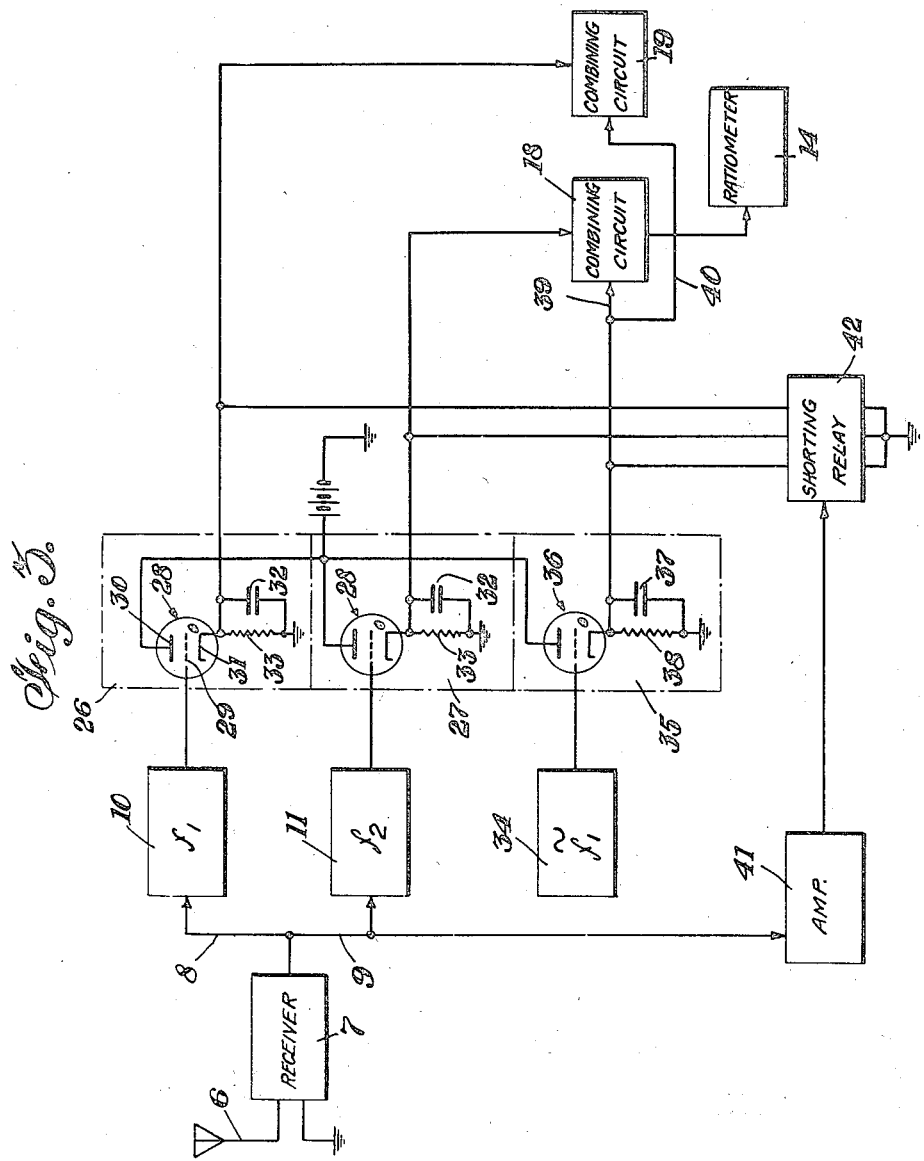

2,462,853

UNITED STATES PATENT OFFICE 2,462,853

FREQUENCY OPERATIVE AZIMUTH INDICATOR

Alexander Frum, New York, N. Y., assignor to Federal Telephone and Radio Corporation, New York, N. Y., a corporation of Delaware Application September 13, 1945, Serial No. 616,061

8 Claims. (Cl. 343—106)

This invention relates to radio beacons and more particularly to radio beacon systems of the omnidirectional type.

In a copending application of E. Labin and D. D. Grieg, Serial No. 581,974, filed March 10, 1945, an omnidirectional radio beacon system is described. In accordance with that system, a sharply directive energy beam, modulated with two signals, varying as the sine and cosine function of the angle of rotation, is transmitted and rotated at a predetermined speed. In the receiver the two different modulations are separated and compared preferably in a ratiometer to provide an indication of the azimuth position of the receiver with respect to the beacon. In this aforesaid application is illustrated a transmitter in which amplitude variations of the signal energy in accordance with sine and cosine functions are transmitted at the beacon. Receiver equipment is provided to separate these different signals and integrate them over the period corresponding to the duration of the received beam energy for comparison in a ratiometer.

It is an object of my invention to provide a radio beacon system of the type generally outlined above wherein the distinguishing signals are provided by frequency modulation of different basic frequency energies.

It is a further object of my invention to provide a novel receiver circuit for receiving a composite energy beam of two different modulation frequencies variable in frequency in accordance with the azimuth angle of the beam, and to measure the detected frequencies of these signals at the receiver for comparison to determine the azimuth direction.

It is a still further object of my invention to provide a system in which a voltage proportional to the frequency of each of two different frequencies is produced at a receiving point and these produced voltages are then compared for the purpose of providing a directional indication.

It is a still further object of my invention to provide a novel circuit for simultaneously, effectively measuring a summation of voltages produced by the number of cycles present in a beam over a predetermined period of time, and comparing these voltages to produce a desired indication.

According to a feature of my invention, a relatively sharp beam of energy is transmitted and rotated azimuthally at a constant angular velocity. This beam of energy is modulated with two signals, each signal comprising a predetermined basic frequency which is varied from the basic center frequency value by a predetermined amount in accordance with the azimuth angle of the beam. The composite energy from the angular beam may be received at any of several receiving points about the beam. The energy of the predetermined frequency at the receiver is then passed through a discriminator circuit and applied to an indicating receiver. Preferably, the variations in frequency with angle, for the two signals, follow essentially sine and cosine functions variation, preferably variation proportional to 1+ sine and 1+ cosine of the angle respectively. At the receiver, the discriminators, for example, may comprise linear frequency discriminators which will provide output amplitude energies proportional to the received frequency applied. The relative amplitude of the applied frequency signals may be controlled by volume control circuits having a common bias source for maintaining amplitude of the signals at the same level. Furthermore, instead of first discriminating between the two signals and then applying them to a meter either with or without integration, I provide an integrating circuit which will serve simultaneously to provide a discrimination of the signals in accordance with the frequency and integration so that a comparison of the signals will produce an indication proportional to the center value of the frequency of the beam. This integrating circuit, in effect, may be an impulse or cycle counter arrangement which will produce a summation of the cycles of received energy.

While I have outlined above generally some features and objects of my invention, a better understanding of these and other features and objects may be had from a particular description of certain embodiments of my invention made with reference to the accompanying drawings, in which:

Fig. 1 is a block circuit diagram of a transmitter-receiver system in accordance with my invention;

Fig. 2 is a block circuit diagram of a modified circuit which may be substituted for part of the circuit of Fig. 1; and Fig. 3 is a circuit diagram, partly in block and partly schematic, of an alternative receiver equipment in accordance with the principles of my invention.

Turning first to Fig. 1, reference character 1 represents a radio frequency transmitter coupled to a directive antenna 2. Two sources of energy 3 and 4 are coupled to transmitter 1 for the purpose of modulating the energy transmitted from the antenna 2. Preferably, source 3 may have a basic center frequency $f_1$ while source 4 produces a center basic frequency of $f_2$. The antenna 2 is continuously rotated and the basic frequencies $f_1$ and $f_2$ of sources 3 and 4 are simultaneously varied therewith as indicated by the broken line connection 5. Preferably, circuits 3 and 4 are varied in frequency so that the frequency variation represents sine and cosine function of the angular azimuth position of antenna 2.

Energy from antenna 2 is received on receiving antenna 6 and applied to receiver 7 where the modulation frequencies are detected. These modulation frequencies are then applied over branch lines 8 and 9 to filters 10 and 11 respectively. Filter 10 is a band-pass filter tuned to pass center frequency $f_1$ and its side band variations due to the frequency modulation at the source, while filter 11 is designed to pass center frequency $f_2$ and its side band variations. The output energy from filter 10 is passed on to a frequency discriminator 12, while the energy from filter 11 is applied to discriminator 13. Frequency discriminators 12 and 13 may be of any known type. It will be recognized that while the discriminators 12 and 13 should be linear if the transmitted energy follows precisely the sine and cosine functions of $1+m \cos \phi$ and $1+m \sin \phi$; where $\phi$ is the azimuth angle of the antenna, these need not be linear if the energy at the modulator is not modulated in this manner. Thus, the discriminators 12 and 13 may themselves have a freqeuncy characteristic such that the variation in the output will cause the output energy to have the desired sine and cosine functions.

It will be recognized that in the output of filters 10 and 11 the energy represents a value of 1+ cosine and 1+ sine function. In order that the output energy may provide a 360° indication on the ratiometer, such as ratiometer 14, it is necessary to subtract from each of the output waves a value equal to half the amplitude swing of the sine and cosine functions, which is represented by the numeral 1 in the above-stated sine and cosine functions. To this end, in the output lead of filter 10 is provided a potentiometer 15 which may be tapped at any desired point so that line 16 will carry the desired amplitude level of the energy. Similarly, in the outlet of filter 11 is provided potentiometer 17 coupled to a lead 18 for the same purpose. Energy from discriminator 12 and line 16 is applied to combining circuit 19 so that the output of combining circuit will correspond to the cosine function of the angle represented by the discriminated frequency. A similar combining circuit 20 is coupled to the output of discriminator 13 in line 18 to provide an output energy proportional to the frequency representing the sine function of the angle of azimuth. These output energies are then applied to ratiometer 14 providing an indication of azimuth of receiver 7 with respect to radio beacon transmitter 1. The indexing potentiometers 15 and 17 permit compensation for differences in the modulation index of the two waves, differences in slope of the discriminators 12 and 13, etc. It is clear that if no such differences exist, the input to combining circuits 19 and 20 may be taken from one potentiometer, such as 15 or 17 instead of providing two such potentiometers.

In the system shown in Fig. 1, it is assumed that the two signal frequencies $f_1$ and $f_2$ are received with equal amplitudes or at least a fixed amplitude ratio so that the amplitudes remain substantially constant during the signalling period. However, in some instances this may not be true. In such a case, the equipment shown in Fig. 1 may be modified as shown in Fig. 2. According to this modified arrangement, in the output of each of the filters 10 and 11 is provided associated amplifiers 21 and 22. Automatic volume control rectifiers 23 and 24 are provided, supplied with a common bias potential by battery 25. Thus, the volume control of the two amplifiers 21 and 22 will be such as to maintain a substantially constant amplitude level throughout the operating period of the system.

In the system illustrated in Fig. 1, the output of the discriminator is shown connected directly to combining circuits 19 and 20. In order to secure more precise indications of the center of the beam, integrating circuits may be coupled in the output of these discriminators if desired in the manner illustrated in the aforementioned copending application, Serial No. 581,974. However, in Fig. 3 is shown a modification of the receiver circuit of Fig. 1 which may eliminate the necessity for amplitude equalization such as indicated in Fig. 2 and separate frequency discriminator and integrator for the circuit of Fig. 1. According to this arrangement, the outputs of filters 10 and 11 are applied to cycle or pulse counting circuits 26 and 27 respectively. These cycle counting circuits may be of any known form and as illustrated each comprises a gas-filled tube 28 provided with a grid 29, anode 30 and a cathode 31. Tube 28 is preferably so constructed that when its grid 29 is rendered negative it will cause discontinuance of conduction of the tube. A common plate supply battery is provided to furnish the plate potential for both tubes 28. In each of the cathode circuits is provided a condenser-resistance combination 32, 33. Condenser 32 is preferably of such size that it will only be partially charged for each unblocking action of tubes 28. During the period the beam is passing the receiver 7, the series of pulses will be passed through the triggering tubes 28 building up charges on condensers 32, proportional to the number of cycles of the two waves. Thus, an integration or summation of the number of cycles received during this interval is provided in the condensers. The output of these condensers is then coupled to the combining circuits 18 and 19 as in the circuit in Fig. 1. In the present arrangement as shown in Fig. 3, the fixed potential for subtraction in the combining circuits is supplied by a local oscillator 34 which operates at one of the center frequencies, center frequency $f_1$ for example. The output of oscillator 34 is supplied to a counting circuit 35, similar in construction to counters 26 and 27. This comprises a tube 36 having in its output a storage condenser 37 and a resistor 38. The output voltage proportional to half the frequency of the two variations permissible in $f_1$ and $f_2$ is fed through separate lines 39 and 40 to combining circuits 18 and 19 so that the combined output may be applied to the ratiometer 14 in the same manner as explained above. Since condensers 32, 37 are shunted by relatively high resistance elements, 33 and 38, the charge on these condensers may not be reduced sufficiently between rotations of the beam to provide a true integration. Accordingly, the output of receiver 7 may be applied to an amplifier 41 and to a shorting relay 42. The shorting relay 42 is provided to respond to reception of energy in receiver 6 so as momentarily to short circuit the condensers discharging them and then to remain open for a period at least equal to the duration of the time that the beam passes the receiver. A shorting relay, for example of the type described in the above referred to application, Serial No. 581,974, may be used.

While I have disclosed my invention embodied in somewhat specific circuit arrangements, it should be clear that many departures from the drawings may be made within the scope of my invention. These illustrations are made merely by way of example and are not to be considered as a limitation on my invention as set forth in the objects and the appended claims.

I claim:

1. A radio beacon comprising a transmitter for transmitting an energy beam, means for rotating said beam, a first means for modulating the energy of said beam with a signal varying in frequency as a sine function in accordance with the rotary position of said beam, and a second means for modulating the energy of said beam with a second signal varying in frequency as a cosine function in accordance with the rotary position of said beam.

2. A radio beacon comprising a transmitter for transmitting energy in the form of a beam, means for rotating said beam, a first means for modulating the energy of said beam with a signal of a given frequency said frequency being variable as a function of 1+ sin of the rotary angle of the beacon, and a second means for modulating the energy of said beam with a second signal of a given frequency varying as a function of 1+ cos of the rotary angle of the beam.

3. A beacon system comprising a transmitter for transmitting a rotatable beam signal of different basic frequencies each varying in frequency in accordance with sine and cosine functions as the beam rotates to a given angle, and a receiver for receiving said beam for separating the separate frequencies and means for producing amplitude variations in accordance with the particular frequency of the separated beam, and means for comparing the ratios of the separated signal.

4. A receiver adapted to provide an indication of direction with respect to a station provided with an angularly movable radio beam modulated with signals of different basic frequencies varying in frequencies in accordance with sine and cosine functions as the beam moves through a given angle, comprising means for receiving said beam, means for separating the different basic frequencies in the output of said receiver, means for producing voltage amplitudes from said separated signals in accordance with the separated frequencies, and means for measuring the ratio of the derived voltages.

5. A receiver adapted to provide an indication of direction with respect to an angularly movable radio beam having signals of different basic frequencies varying in frequencies in accordance with sine and cosine functions as the beam moves through a given angle, comprising means for receiving said beam, means for separating the different basic frequencies in the output of said receiver, means for producing voltages proportional to the number of cycles of the respective separated signals, and means for comparing said voltages to provide an azimuth indication.

6. A receiver adapted to provide an indication of direction with respect to a station provided with an angularly movable radio beam modulated with signals of different basic frequencies varying in frequencies in accordance with sine and cosine functions as the beam moves through a given angle, comprising means for receiving said beam, means for separating the different basic frequencies in the output of said receiver, frequency discriminator means for deriving voltages proportional to the respective frequencies of the received signals, and means for comparing said voltages to provide azimuth indications.

7. A receiver adapted to provide an indication of direction with respect to a station provided with an angularly movable radio beam modulated with signals of different basic frequencies varying in frequencies in accordance with sine and cosine functions as the beam moves through a given angle, comprising means for receiving said beam, means for separating the different basic frequencies in the output of said receiver, a common reference volume control means for maintaining substantially constant amplitude ratio of said separated signals, means for producing voltage amplitude proportional to the frequencies of said separated signals, and means for comparing said produced voltage amplitude.

8. A radio beacon receiver for receiving energy from a rotatable beam modulated with first and second energies at different basic frequencies, said basic frequencies being variable in accordance with the angular position of said beam to provide first and second signals, comprising a radio receiver for receiving energy from said beam and detecting said energy to provide energy at said first and second frequencies, means for separating said signal frequencies, means for producing amplitude levels corresponding to the frequencies of said received energy, means for providing other amplitude signals corresponding substantially to half the variations in said first and second signals, means for subtracting said other signals from said first and second signals respectively, and means for comparing the ratios of said combined energies.

ALEXANDER FRUM.

REFERENCES CITED

The following references are of record in the file of this patent:

UNITED STATES PATENTS

| Number | Name | Date |
|---|---|---|
| 2,377,902 | Relson | June 12, 1945 |

FOREIGN PATENTS

| Number | Country | Date |
|---|---|---|
| 380,466 | Great Britain | Sept. 15, 1932 |